United States Patent [19]

Inoue

[11] Patent Number: 4,495,038
[45] Date of Patent: Jan. 22, 1985

[54] METHOD OF AND APPARATUS FOR ELECTROEROSIVELY WIRE-CUTTING A CONDUCTIVE WORKPIECE

[75] Inventor: Kiyoshi Inoue, Tokyo, Japan

[73] Assignee: Inoue-Japax Research Incorporated, Yokohama, Japan

[21] Appl. No.: 406,891

[22] Filed: Aug. 10, 1982

[30] Foreign Application Priority Data

Aug. 12, 1981 [JP] Japan .................................. 56-127087

[51] Int. Cl.³ ........................... C25F 3/14; B23K 9/16
[52] U.S. Cl. ............................... 204/129.2; 219/69 W; 219/69 M; 204/202; 204/224 M
[58] Field of Search ...................... 204/129.2, 206, 209, 204/224 M, 225; 219/69 W, 69 M

[56] References Cited

U.S. PATENT DOCUMENTS

| | | | |
|---|---|---|---|
| 2,903,557 | 9/1959 | Matulaitis | 219/69 W |
| 4,081,652 | 3/1978 | Jänicke et al. | 219/69 W |
| 4,333,806 | 6/1982 | Inoue | 204/129.2 |

FOREIGN PATENT DOCUMENTS

| | | | |
|---|---|---|---|
| 43394 | 4/1979 | Japan | 204/224 M |
| 156295 | 12/1979 | Japan | 219/69 W |
| 1556713 | 11/1979 | United Kingdom . | |

*Primary Examiner*—R. L. Andrews
*Assistant Examiner*—Terryence Chapman
*Attorney, Agent, or Firm*—Karl F. Ross; Herbert Dubno

[57] ABSTRACT

A wire-cut electroerosion machining method and apparatus in which the rate of axial travel of the electrode wire is temporarily increased immediately upon a change by the electrode wire of its course at a corner in a prescribed cutting path. The axial travel rate is preferably increased as a function of the angle of intersection defining the corner. Also, the time period in which the wire axial travel rate is increased should advantageously be varied as a function of, e.g. in inverse proportion to, the angle of intersection defining the corner.

18 Claims, 4 Drawing Figures

METHOD OF AND APPARATUS FOR ELECTROEROSIVELY WIRE-CUTTING A CONDUCTIVE WORKPIECE

FIELD OF THE INVENTION

The present invention relates generally to traveling-wire electrical machining and, more particularly, to a new and improved method of and apparatus for electroerosively machining a conductive workpiece with a continuous electrode wire wherein the electrode wire axially stretched under tension across wire-supply and wire-takeup sides is axially advanced continuously to travel through the workpiece between a pair of wire-guide members at a predetermined rate of travel, an electroerosion machining current is passed between the traveling electrode wire and the workpiece across a machining gap flushed with a machining fluid, and the traveling axis of the electrode wire is advanced relative to the workpiece along a prescribed cutting path having at least one corner to advance electroerosion machining of the workpiece along the cutting path. The term "electrode wire" is used throughout herein to refer to an electrical machining electrode in the form of a wire, tape or a like thin, elongate, continuous body.

BACKGROUND OF THE INVENTION

In electrical machining of this type, of which a most typical form utilizing a succession of electroerosive electrical discharges is commonly called "traveling-wire EDM" or "wire-cut EDM", the electrode wire is continuously advanced from a supply side, e.g. in the form of a wire-storage reel, to a takeup side, e.g. in the form of a wire-takeup reel, through a machining zone in which the workpiece is positioned. The machining zone is flushed with a machining liquid, typically distilled water or a liquid dielectric (in electrical discharge machining or EDM) or a liquid electrolyte (in electrochemical machining or ECM), or a weakly conductive liquid electrolyte (in electrochemical-discharge machining or ECDM). The workpiece is juxtaposed with the axially traveling wire across the machining zone between a pair of guide members which serve to stretch the traveling wire for positioning it precisely in a predetermined machining relationship with the workpiece. A series of electrical pulses are applied across a machining gap formed between the workpiece and the traveling electrode wire to effect time-spaced electrical discharges thereat to electroerosively remove material from the workpiece in the typical EDM mode of wire-cutting process. In the ECDM mode of wire-cutting process, the electrolytic material solubilization is also utilized in addition to the EDM action. The ECM mode of operation utilizes a purely electrolytic action for the workpiece material removal process and may make use of a continuous DC current.

As material removal proceeds, the workpiece is displaced relative to and transversely to the continuously traveling wire electrode, typically under numerical control, along a predetermined path to generate a desired pattern of cut in the workpiece. The continuous advancement or travel of the wire is effected typically by traction drive rollers disposed at a location between the guide member on the downstream side and the wire takeup means. A desired tension is established in the traveling wire typically by providing brake rollers at a location between the guide member on the upstream side and the wire supply means.

It is known that the achievement of a satisfactory machining accuracy requires the use of a wire electrode as thin as 0.05 to 0.5 mm in diameter. The machining fluid is supplied into the machining gap to serve as an electrical machining medium, to carry away the machined products and simultaneously to cool the thin electrode and the workpiece.

The present invention is based upon the recognition that in the traveling-wire electroerosive process with these unique characteristics, machining instability is created from time to time. It has now been recognized that machining instability is brought about as a function of the shape of the cutting path and especially in the regions of turning points or corners in the path traveled by the electrode wire. When machining becomes unstable, machining discharges tend to shift into an arc discharge or short-circuiting type electrical current passage, resulting in excessive heating of the electrode wire and consequently the breakage of the electrode wire and a reduced machining accuracy and efficiency.

OBJECTS OF THE INVENTION

Accordingly, the present invention seeks to provide a novel and improved traveing-wire electroerosive machining method and apparatus whereby high stabilized machining continuation is assured.

The present invention also seeks to provide a method and apparatus of the type described whereby the machining stability is assured consistently throughout a given machining operation involving a cutting path having successive sections intersecting at an angle.

SUMMARY OF THE INVENTION

In accordance with the present invention there is provided, in a first aspect thereof, a method of electroerosively wire-cutting a conductive workpiece, which method comprises: (a) axially advancing a continuous electrode wire streched under tension across wire-supply and wire-takeup sides to cause it to continuously travel through the workpiece between a pair of wire-guide members at a predetermined rate of travel; (b) passing an electroerosion machining current between the traveling electrode wire and the workpiece across a machining gap flushed with a machining fluid; (c) advancing the traveling axis of the electrode wire relative to the workpiece along a prescribed path having at least one corner, to advance electroerosion machining of the workpiece along the path; and (d) temporarily increasing the rate of axial advance of the electrode wire immediately upon its change of course at the corner along said path.

Preferably, the rate of axial advance of the electrode wire is increased as a function of the angle of intersection defining the corner. Thus, it has been found to be advantageous to increase the wire axial travel rate to a value which is generally inversely proportional to the angle of intersection defining the corner. The increased wire axial travel rate is maintained for a predetermined time period while the axis of the wire is allowed to continue to advance along the prescribed cutting path. In addition or alternatively, the time period in which the wire axial travel rate is increased should be inversely proportional to the aforesaid angle. In general, the wire axial travel rate should be varied as a function of the curvature of the cutting path.

The invention provides, in a second aspect thereof, an apparatus for electroerosively wire-cutting a conductive workpiece, comprising: (a) means for axially advancing a continuous electrode wire stretched under tension across wire-supply and wire-takeup sides to cause it to continuously travel through the workpiece between a pair of wire-guide members at a predetermined rate of travel; (b) means for passing an electroerosion machining current between the traveling electrode wire and the workpiece across a machining gap flushed with a machining fluid; (c) means for advancing the traveling axis of the electrode wire relative to the workpiece along a prescribed cutting path having at least one corner to advance electroerosion machining of the workpiece along the cutting path; and (d) means for acting on means (a) to temporarily increase the rate of axial advance of the electrode wire immediately upon its change of course at the corner.

The apparatus preferably includes further means (e) for sensing arrival by the axis of the electrode wire at the corner or the change by the electrode wire axis of its course at the corner to produce an electrical signal and actuating the means (d) in accordance with the electrical signal.

Preferably, means (e) is adapted to sense the angle of intersection defining the corner and means (d) is adapted to increase the rate of axial travel of the electrode wire in accordance with the sensed angle. In addition or alternatively, means (d) is adapted to vary the time period of increasing the rate of axial travel of the electrode wire in accordance with the sensed angle.

BRIEF DESCRIPTION OF THE DRAWING

These and other features of the present invention as well as advantages thereof will become more readily apparent from a reading of the following description of an example thereof when taken with reference to the accompanying drawing in which.

SPECIFIC DESCRIPTION

Figure 1:
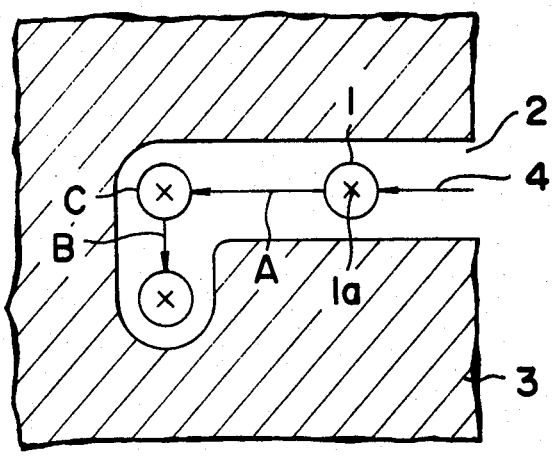
FIG. 1 is a schematic illustration diagrmmatically representing the electroerosive machining of a workpiece with a traveling wire electrode.

FIG. 1 shows a schematic view illustrating an electrode wire 1 which while being axially displaced is moved to produce a cut 2 in a workpiece 3, taken from above, in a plane perpendicular to the axis 1a of the electrode wire 1. The electrode wire 1 is moved, relative to the workpiece 3, along a predetermined cutting trajectory or path 4 dictated by preprogrammed NC (numerical control) commands. The cutting path 4 is shown including two sections A and B which are rectilinear and interconnected by a section or point C with an angularity. When the electrode wire 1 is allowed to travel continuously at a fixed rate of travel upon its axis moving through the region of the turning point or corner C, it has been discovered that the wire 1 tends to be broken. It has been observed that immediately upon the wire 1 turning the corner C, machining discharges produced between the electrode wire 1 and the workpiece 3 tend to become arcing or short-circuiting type discharges. As a result, it appears that a portion of the traveling wire 1 is heated up excessively and tends to be broken. This problem is effectively overcome in accordance with the present invention.

Figure 2:
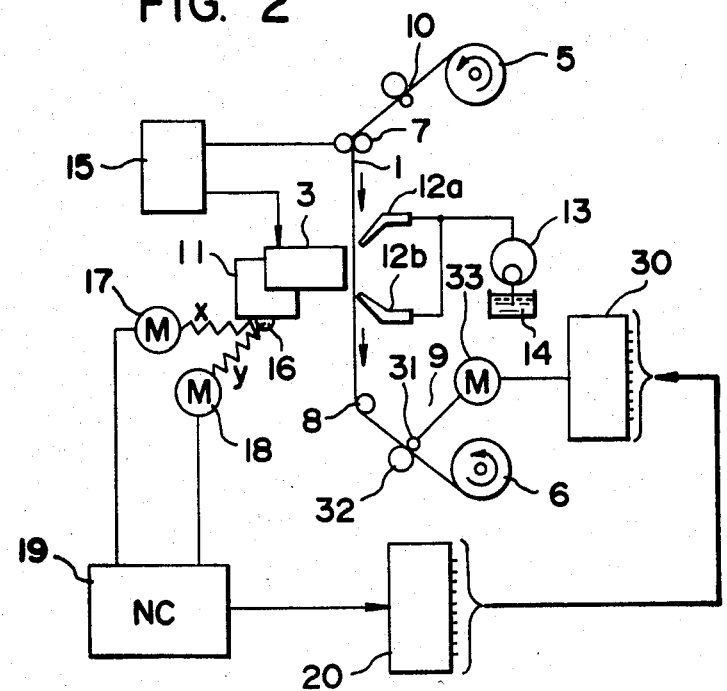
FIG. 2 is a schematic view diagrammatically illustrating a wire-cut EDM apparatus embodying the principles of the present invention.

Referring now to FIG. 2, which illustrates a certain embodiment of the present invention, an electrode wire 1 composed of, say, copper or brass and having a thickness ranging between 0.05 and 0.5 mm is shown fed from a supply reel 5 and wound on a takeup reel 6 while being supported and guided by a pair of support and guide units 7 and 8. The axial displacement of the electrode wire 1 is effected by means of a traction motor drive arrangement 9 provided downstream of the guide member 8 with a braking motor drive 10 being provided upstream of the guide member 7 to cause the wire 1 to axially travel under tension at a preset rate of axial travel between the members 7 and 9 and through the machiing gap G formed between the vertically traveling electrode wire 1 and a workpiece 3 juxtaposed therewith. The workpiece 3 is carried on a worktable 11 so as to be movable in a horizontal plane.

A pair of machining fluid supply nozzles 12a and 12b are disposed on the upper and lower sides of the workpiece 3, respectively, to direct downwards and upwards into the machining gap G streams of the machining fluid supplied under pressure by a pump 13 from a reservoir 14. The machining fluid is commonly a distilled water liquid having a specific resistance ranging between $10^3$ and $10^5$ ohm-cm.

The electrode wire 1 and the workpiece 3 are energized by a power supply 15 for applying a succession of electrical pulses across the machining gap G flooded with the machining liquid to create time-spaced electrical discharges therethrough, thereby electroerosively removing material from the workpiece 3.

The worktable 11 on which the workpiece 3 is securely mounted is carried on a cross-feed arrangement 16 which is driven by a first motor 17, e.g. a stepping motor, for displacing the worktable 11 along an x-axis and a second motor 18, e.g. a stepping motor, for displacing the worktable 11 along a y-axis orthogonal to the x-axis, the two motors being driven by electrical signals furnished from a numerical-control (NC) unit 19 to displace the workpiece 3 relative to the traveling electrode wire 1 along a programmed cutting path 4 (FIG. 1).

The NC unit 19 has a magnetic tape or any other recording medium on which the information preprogrammed for the cutting path 4 (FIG. 1) is stored. A suitable reproduction means is provided to read out the information and to generate feed signals which are applied to pulse distribution circuits designed to distribute clock pulses from a time base into x- and y-component drive pulses and to apply them to the stepping motors 17 and 18, respectively, whereby to displace the workpiece 3 so that the axis 1a of the electrode wire 1 effectively moves along the desired cutting path 4.

In accordance with the principles of the present invention there is provided a sensing circuit unit 20 for detecting the local shape of the wire-cutting path 4, and a control circuit unit 30 responsive to the sensing circuit unit 20 for controlling the motor 33, thereby controlling the rate of axial travel of the electrode wire 1 as a function of the angle of a corner in the wire-cutting path 4.

Figure 3:
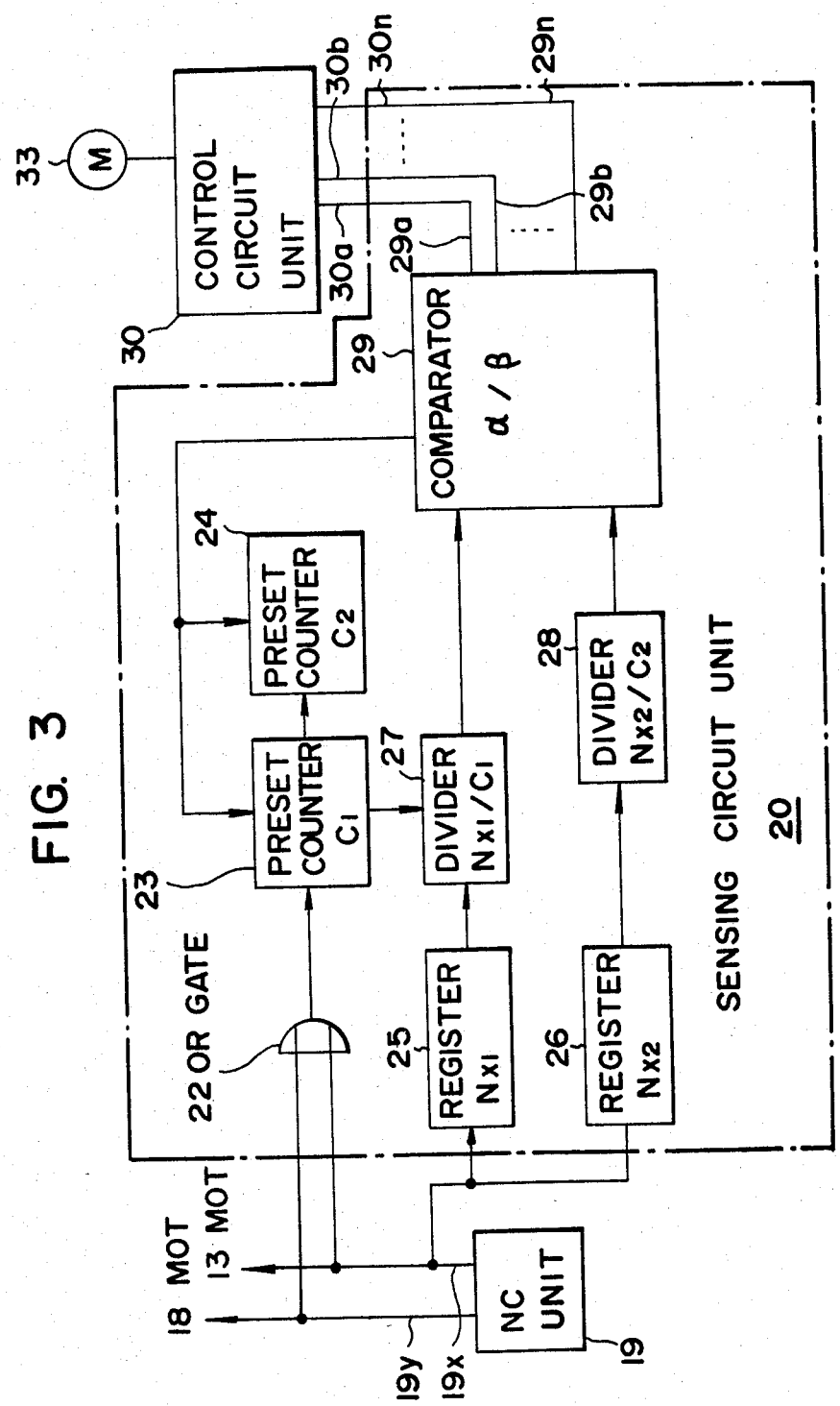
FIG. 3 is a schematic view diagrammatically illustrating portions of the elements shown in FIG. 2, including the sensing circuit unit.
Figure 4:
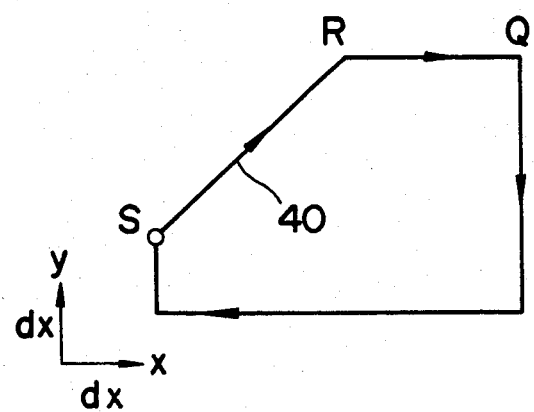
FIG. 4 is a schematic illustration of a wire-cut electrical-contour-machining path having various turning points or corner therein.

Referring to FIG. 3, the sensing circuit unit 20 includes an OR gate 22 having inputs connected to the x-component drive pulse output 19x and y-component drive pulse output 19y of the NC unit 19 for re-connecting the distributed x-component drive pulses and y-component drive pulses into a uniform train of pulses which are counted by two preset counters 23 and 24, the counter 24 counting overflow counts from the counter 23. Further counters (registers) 25 and 26 having their inputs both connected to the x-component drive pulse output 19x have their outputs connected to dividers 27 and 28, respectively. The divider 27 is used to compare a number $N \times 1$ of x-component drive pulses $\times 1$ counted by the counter 25 with the preset count C1 of the counter 23 to provide an output signal representing $N \times 1/C1 = \alpha$, and the divider 28 is used to compare a number $N \times 2$ of x-component drive pulses $\times 2$ counted by the counter 26 with the preset count C2 of the counter 24 to provide an output signal representing $N \times 2/C2 = \beta$. It will be apparent that the ratio $\alpha/\beta$ when $\alpha = \beta$ shows that the electrode wire 1 is advancing rectilinearly along the path 40 (FIG. 4). When $\alpha \neq \beta$, the wire 1 is turning on a corner and the ratio $\alpha/\beta$ represents the angle of the corner. A comparator 29 is thus connected to the outputs of the dividers 27 and 28 to compare the values $\alpha$ and $\beta$. The comparator 29 is designed to provide no output signal when $\alpha = \beta$ and, when $\alpha \neq \beta$, to provide an output signal "1" at one of a plurality of other preset outputs 29a, 29b, ..., 29n according to a particular angle of the corner sensed. The output terminals 29a, 29b, ... 29n of the comparator 29 are connected to the input terminal 30a, 30b, ... , 30n of the control circuit unit 30 which controls the operation of the motor 33 for the wire drive unit 9. Each instant the comparison is executed by the comparator 29, the counters 23, 24, 25 and 26 are cleared and recommence counting. The control circuit 30 is designed to establish different rates of axial travel of the electrode 1 preset to correspond to the particular positions of the inputs 30a, 30b, ..., 30n which are actuated by the comparator 29.

The wire drive unit 9 comprises a capstan 31 and a pinch roller 32 (FIG. 1) arranged to drive the electrode wire 1 therebetween to axially travel in the direction indicated. The capstan 31 is driven by a motor 33 which is controlledly driven by the motor-drive control circuit unit 30. When no signal develops at the outputs of the comparator 29 indicating $\alpha = \beta$, or that the electrode wire 1 is advancing rectilinearly in the cutting feed path, the control circuit unit 30 operates to hold the electrode wire 1 to travel axially at a fixed rate of travel between the guide members 7 and 8. When the electrode wire 1 is turning on a corner, the comparator 29 senses the ratio $\alpha/\beta$ and in accordance with the particular value of the ratio sensed indicating the particular angle of the corner, acts to selectively actuate the corresponding output 29a, 29b, ..., 29n. The control circuit unit 30 is thereby set to establish the particular rate of travel of the electrode wire 1.

Let it be assumed that the wire-cutting EDM operation is to proceed along a cutting path 40 as shown in FIG. 4, the path having a start point S. In the initial section, the axis 1a of the electrode wire 1 is displaced (relative to the workpiece 3) along a rectilinear path SR under the command of the numerical controller 19 distributing drive pulses into x-axis and y-axis components accordingly. As long as the electrode wire 1 is advancing rectilinearly along a path, the control circuit unit 30 is set to drive the motor 33 at a constant rpm such that the electrode wire 1 is axially driven to travel at a preset lowest rate of travel Vo. At point R, the path is caused to turn and then becomes again rectilinear until the region of point Q is reached. In the successive displacements, the axis of the electrode wire 1 is stepped to move dx, -dx, dy or -dy per one increment drive pulse.

In the section SR, the ratio $\epsilon dx/\epsilon(dx+dy)$ is always constant because the path is rectilinear. All of the drive pulses furnished to the motors 17 and 18 from the NC unit 19 are applied through the OR gate 22 to the counters 23 and 24 for counting thereby. The x-component drive pulses furnished to the motor 17 are counted by the counters 25 and 16. The counter 23 counts a total number C1 of x- and y-component drive pulses until the N1-th pulse and the counter 25 counts a total number $N \times 1$ of x-component drive pulses. The counter 24 counts a total number C2 of x- and y-component drive pulses until the N2-th pulse and the counter 26 counts a total number C2 of x-component drive pulses (N2>N1, C2>C1). In the section SR, the ratio $N \times 1/C1 = \alpha$ is equal to $N \times 2/C2 = \beta$. The comparator 29 then furnishes no output, thus holding the electrode wire 1 to travel axially at the aforesaid predetermined lowest rate.

In the region of turning point R, the ratio $\epsilon dx/\epsilon(dx+dy)$ will change. Specifically, the number of dy diminishes and eventually becomes nil to cause the proportion of $\epsilon dx$ of $\epsilon(dx+dy)$ to increase. The deviation of $\beta$ from $\alpha$ represents the angle of the corner which may as shown be 135°. The comparator 29 now furnishes the "1" signal, say, at the output 29b to reset the control circuit unit 30 to operate the motor 33 so that the rate of axial travel of the electrode wire 1 is switched to a higher value V2. The electrode wire 1 is then allowed to continue to travel at V2 for a predetermined short time period. After lapse of that time period, the wire axial travel rate is returned to Vo.

After passage over turning point R, the cutting path becomes again rectilinear until the region of turning point Q is reached. In this section in which the path is in parallel with the y-axis, $\epsilon dy = 0$, $C1 = N \times 1$ and $C2 = N \times 2$ so that $\alpha = \beta$. The output of the comparator 29 is returned to nil so that the rate of axial travel of the electrode wire 1 is resumed to the predetermined low rate Vo. When the turning point or corner Q is reached, $\beta$ deviates from $\alpha$ and the comparator 29 ascertains the angle of the corner Q which may as shown be 90° and acts to actuate the particular output, say 29d so that the control circuit 30 is reset to alter the rate of axial travel of the electrode wire 1 to a higher value V4. The electrode wire 1 is allowed to travel at the rate V4 for a predetermined time interval. After the lapse of the time interval, the rate of axial drive is returned to Vo.

What is claimed is:

1. A method of electroerosively wire-cutting a conductive workpiece, comprising the steps of:
   (a) axially advancing a continuous electrode wire stretched under tension across wire-supply and wire-takeup sides to cause it to continuously travel through the workpiece between a pair of wire-guide members at a predetermined rate of travel;
   (b) passing an electroerosion machining current between the traveling electrode wire and the workpiece across a machining gap flushed with a machining fluid;
   (c) advancing the traveling axis of said electrode wire relative to said workpiece along a prescribed cutting path having at least one corner to advance electroerosion machining of said workpiece along said cutting path; and (d) temporarily increasing the rate of axial advance of said electrode wire immediately upon its change of course at said corner along said path.

2. The method defined in claim 1 wherein in step (d) said rate of axial advance is increased for a predetermined time interval while the axis of said wire is allowed to continue to advance along said path.

3. The method defined in claim 2 wherin said time interval is varied as a function of the angle of intersection defining said corner.

4. The method defined in claim 3 wherein said time interval is varied generally in inverse proportion to said angle.

5. The method defined in claim 1 wherein said rate of axial travel of the electrode wire is increased as a function of the angle of intersection defining said corner.

6. The method defined in claim 5 wherein said rate of axial travel of the electrode wire is increased generally in inverse proportion to said angle.

7. The method defined in claim 6 wherein said rate of axial travel of the electrode wire is increased for a predetermined time period.

8. The method defined in claim 7 wherein said time period is increased as a function of said angle.

9. The method defined in claim 8 wherein said time period is increased generally in inverse proportion to said angle.

10. The method defined in claim 1 wherein step (d) includes sensing arrival of said axis of the electrode wire at said corner to provide an electrical output signal and temporarily increasing said rate of axial travel of the electrode wire in response to said output signal.

11. The method defined in claim 10, further comprising the step of sensing the angle of intersection defining said corner to provide said output signal.

12. The method defined in claim 11, further comprising the step of increasing said rate of axial travel of the electrode wire as a function of said output signal.

13. The method defined in claim 11 or claim 12, further comprising maintaining said increased rate of axial travel of the electrode wire for a time period varying as a function of said output signal.

14. An apparatus for electroerosively wire-cutting a conductive workpiece, comprising:

(a) means for axially advancing a continuous electrode wire stretched under tension across wire-supply and wire-takeup sides to cause it to continuously travel through the workpiece between a pair of wire-guide members at a predetermined rate of travel;

(b) means for passing an electroerosion machining current between the traveling electrode wire and the workpiece across a machining gap flushed with a machining fluid;

(c) means for advancing the traveling axis of said electrode wire relative to the workpiece along a prescribed cutting path having at least one corner to advance electroerosion machining of said workpiece along said cutting path; and (d) means for acting on means (a) to temporarily increase the rate of axial advance of said electrode wire immediately upon its change of course at said corner.

15. The apparatus defined in claim 14, further comprising means (e) for sensing arrival of said axis of the electrode wire at said corner and actuating the means (d) in response to the sensed arrival.

16. The apparatus defined in claim 15 wherein said means (e) is adapted to sense the angle of intersection defining said corner.

17. The apparatus defined in claim 16 wherein said means (d) is adapted to increase the rate of axial travel of said electrode wire in accordance with said sensed angle.

18. The apparatus defined in claim 1 or claim 16 wherein said means (d) is adapted to vary the time period of increasing the rate of axial travel of the electrode wire in accordance with said sensed angle.

* * * * *